US009321259B2

(12) United States Patent
Milazzo

(10) Patent No.: US 9,321,259 B2
(45) Date of Patent: Apr. 26, 2016

(54) ANTI-FRICTION ROLLER

(71) Applicant: Lee Milazzo, Saint John, IN (US)

(72) Inventor: Lee Milazzo, Saint John, IN (US)

(*) Notice: Subject to any disclaimer, the term of this patent is extended or adjusted under 35 U.S.C. 154(b) by 0 days.

(21) Appl. No.: 14/076,328

(22) Filed: Nov. 11, 2013

(65) Prior Publication Data
US 2015/0129390 A1 May 14, 2015

(51) Int. Cl.
B65G 17/34 (2006.01)
B41F 23/04 (2006.01)
B65G 17/32 (2006.01)
B65G 13/00 (2006.01)

(52) U.S. Cl.
CPC ............ B41F 23/0446 (2013.01); B65G 13/00 (2013.01); B65G 17/32 (2013.01); B65G 17/34 (2013.01)

(58) Field of Classification Search
CPC ........ B65G 13/11; B65G 17/34; B65G 17/16; B41F 23/0446
USPC ....................... 198/803.13; 193/37
See application file for complete search history.

(56) References Cited

U.S. PATENT DOCUMENTS

| 2,309,723 | A | * | 2/1943 | Wilson | B65G 13/08 193/35 C |
| 2,406,000 | A | * | 8/1946 | Dawn | B65G 17/30 198/803.13 |
| 2,821,286 | A | * | 1/1958 | Russell | B65G 17/12 198/803.13 |
| 3,088,579 | A | * | 5/1963 | Husum | B65G 17/34 198/803.13 |
| 3,206,007 | A | * | 9/1965 | Philips | B41F 23/0446 198/803.13 |
| 3,269,501 | A | * | 8/1966 | Reighart | B21D 43/003 193/35 MD |
| 3,572,497 | A | * | 3/1971 | Karpac | B65G 17/12 198/803.13 |
| 4,681,203 | A | * | 7/1987 | Kornylak | B65G 13/11 193/35 R |
| 4,890,714 | A | * | 1/1990 | Brown | B65G 13/11 193/35 A |
| 5,823,732 | A | * | 10/1998 | Lisec | E06B 3/67365 414/278 |
| 7,678,198 | B2 | * | 3/2010 | Hartig | B65G 49/063 118/50 |
| 8,657,553 | B1 | * | 2/2014 | Rasmussen | B65G 13/12 193/35 SS |

OTHER PUBLICATIONS

Preliminary Industry Characterization: Metal Can Manufacturing—Surface Coating; U. S. Environmental Protection Agency, Coatings and Consumer Products Group, Emission Standards Division, Office of Air Quality Planning and Standards, Research Triangle Park, NC 27711; p. 40, Figure 5 "Sheet printing operations".
Industry manufacturer's online catalogue shows wickets with one blunt smooth metal piece attached. http://pfander.com/en/can-making/wickets-and-chains/ (last visited Sep. 6, 2013).

* cited by examiner

Primary Examiner — Gene Crawford
Assistant Examiner — Thomas Randazzo
(74) Attorney, Agent, or Firm — Daniel Zamudio

(57) ABSTRACT

At least one roller connected to a clip via an axle. The clip capable of being removably attached to a wicket, the wicket being well known in the art. The roller provides anti-friction engagement of wicket workpieces that are handled by wickets in industrial processing such as the processing of tinplate sheets.

12 Claims, 5 Drawing Sheets

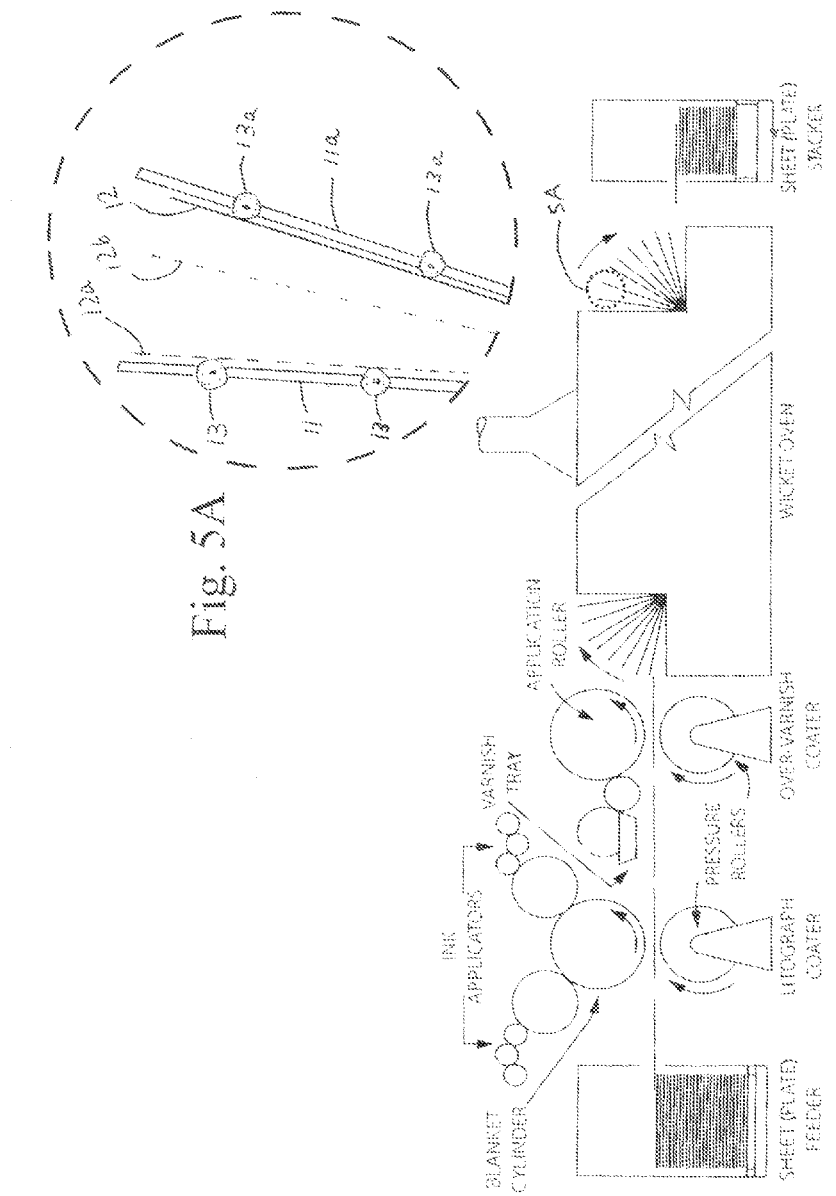

ANTI-FRICTION ROLLER

CROSS-REFERENCE TO RELATED APPLICATIONS

Not applicable.

BACKGROUND

There exist many ways to process metals for commercial use. One example of a processed metal is Tinplate, or terneplate. Terneplate is used for many products such as soup cans, coffee containers, cookie tins, or soda cans to name a few examples. The tinplate is formed into sheets and these sheets are processed by sheet handling machines. The machines for handling terneplate are large and used for, among other things, coating the terneplate with decorative graphics often seen on soup cans or coffee tins. Throughout this processing the sheets are manipulated, or manhandled, and subjected to varying degrees of force, thrusts, twists, turns, torques and the like. Wickets are used in these machines to facilitate handling the sheets.

A wicket is grated and looks like a gate. They are used in the tin sheet coating industry and are often located within wicket ovens. Wickets are used to support sheets of material, usually tin sheets, as they are being processed to make product, the process of drying a painted tin sheet for instance. Aside from being used for supporting metal sheets, wickets are also used to manipulate metals, for example by supporting the tin sheet in a substantially vertical position along a moving conveyor. One other way the sheets are manipulated is by being slid onto and off of the wickets during processing, and for placing dried coated sheets onto a cutting machine, for instance. Wickets are well known and used in many industries, one such industry is a sheet printing operation as depicted in FIG. 5. Because wickets are generally made from a heavy metal, a wicket often scratches the tin during processing.

As is evident from the foregoing, several problems can occur when metals, such as tin sheets, are manhandled with processing machines, particularly those machines using wickets or the like. Tin, or the like, is a soft metal and prone to being scratched. Decorative graphics or other coatings applied to the metal can be ruined by rubbing, smudging or scratching for example. This problem renders the metal unusable for commercial purposes and the metal must then be reprocessed or thrown away.

In the United States alone millions of metal sheets are scratched from contact with wickets. Entire skids of tinplate are scrapped or must be hand sorted to remove the damaged sheets. A skid of tinplate has 1500-1800 sheets when delivered. Some end users will scrap the entire pallet of tin plate and send them back to the coating supplier if they even find a single scratched sheet, this can cost millions of dollars. To date, there is no easily installable solution to help this situation.

Information relevant to attempts to address these problems can be found in U.S. Pat. No. 2,406,000 (Dawn). However, this reference suffers from one or more of the following disadvantages: 1) difficult to install, 2) expensive to implement, 3) ineffective in protecting the metal from scratching during processing. Nothing mentioned in this Background section is admitted to be prior art with respect to the present invention.

For the foregoing reasons, there is a need in the industry for an apparatus that is easy and inexpensive to install and minimizes the friction between wickets and metal thereby preventing damage to the metal from the handling done by wickets.

SUMMARY

The present invention is directed to an apparatus, the utility of which is to prevent damage, scratching to name one example, of metals during processing, such as the processing of tin sheets by wickets. The inventive device is small and inexpensively made. When attached, either singularly or in a plurality, to a wicket, the device provides an anti-friction surface for metal sheets to lie upon as they are manipulated during machine processing, such as by sliding onto and off of a wicket, to name one example of manipulation. Such a device is valuable to industry users because it can eliminate the waste from wicket damaged tin sheets, is easy to install on existing wickets, and is inexpensive to implement.

One embodiment of the invention, which the inventor has reduced to a working example, comprises at least one roller that has a passage or hole. An axle is located within the passage and when engaged with the roller easily allows the roller to spin about the axis of the passage. The axle is prevented from slipping through the passage via a retainer part on either side of the roller, for instance. There is a clip having at least two ends, a clip end and a support end. At least one axle end is attached to the support end of the clip, the support end being removably attached to a wicket. As described briefly above, the wicket is part of a metal processing line such as those found in a wicket oven used in a metal sheet coating operation for example. It is further useful that the invention can be configured to provide for easily maintaining or replacing the roller via the axle being removably attached to the support end.

Another embodiment of the invention comprises at least one low friction surface engaging with at least one holder and a clip having a clip end and a support end. The embodiment further includes the least one holder being attached to the support end and the clip end being removably attached to a wicket. Additionally, the at least one holder could be removably attached to the support end allowing for easy replacement or maintenance of the roller and holder.

A method embodiment of the invention for protecting sheet stock from damage during processing, comprises connecting one or more low-friction devices to a wicket assembly, each low friction device including at least one roller with a central passage therethrough, an axle extending through the central passage, the axle being retained within the central passage by retainers connected to the axle with the roller captured between the retainers. There is a clip connected to an axle end and attaching the one or more low-friction devices to the wicket assembly with the clips of the one or more low-friction devices clipped to the wicket assembly and the rollers of the one or more low-friction devices extending in the same direction from the wicket assembly; and supporting, during processing, a sheet of material via the rollers of the one or more low-friction devices contacting the sheet and spacing apart the sheet and the wicket assembly.

The nature of the roller or low friction surface is such that it provides an anti-friction surface between the tin sheets and the wickets that work on the sheets. The nature of the roller is most easily understood to be wheel-like or substantially shaped like a ball whereas the low friction surface could be a smooth surface such as glass or steel. The inventor further envisions that a roller or low friction surace of various configurations, shapes, sizes, coatings, or material compositions is possible, however, each such roller or low friction surface would serve the purpose of providing an anti-friction surface in a manner similar to that described above.

BRIEF DESCRIPTION OF THE SEVERAL VIEWS OF THE DRAWINGS

These and other features, aspects and advantages of the present invention, which has actually been reduced to practice by the inventor in one embodiment, will become better understood with regard to the following description, appended claims, and accompanying drawings where:

FIG. 5 depicts a sheet printing operation which is well known in the art.

FIG. 5A is a section view taken from FIG.5 showing an embodiment of the invention acting on a workpiece.

DESCRIPTION

Overview.

Figure 1:
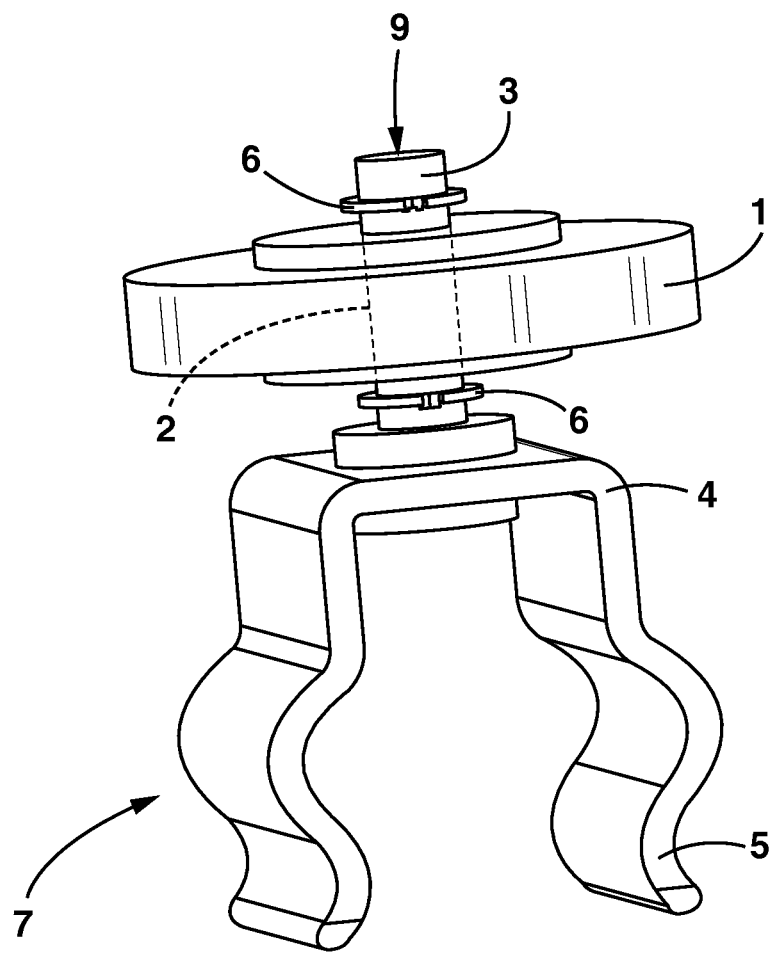
FIG. 1 shows a perspective view of an apparatus embodying features of an of the invention.

As shown in FIG. 1, an apparatus embodying features of an example of the invention comprises a roller 1, having a passage 2 running through its center. Within the passage 2 is located an axle 3 being prevented from passing through the passage 2 via a retainer clip 6 on either side of the roller 1. The apparatus further includes a clip 7 having a support end 4 and opposing clip ends, such as the clip end 5. The axle 3 is connected to the support end 4.

Figure 2:
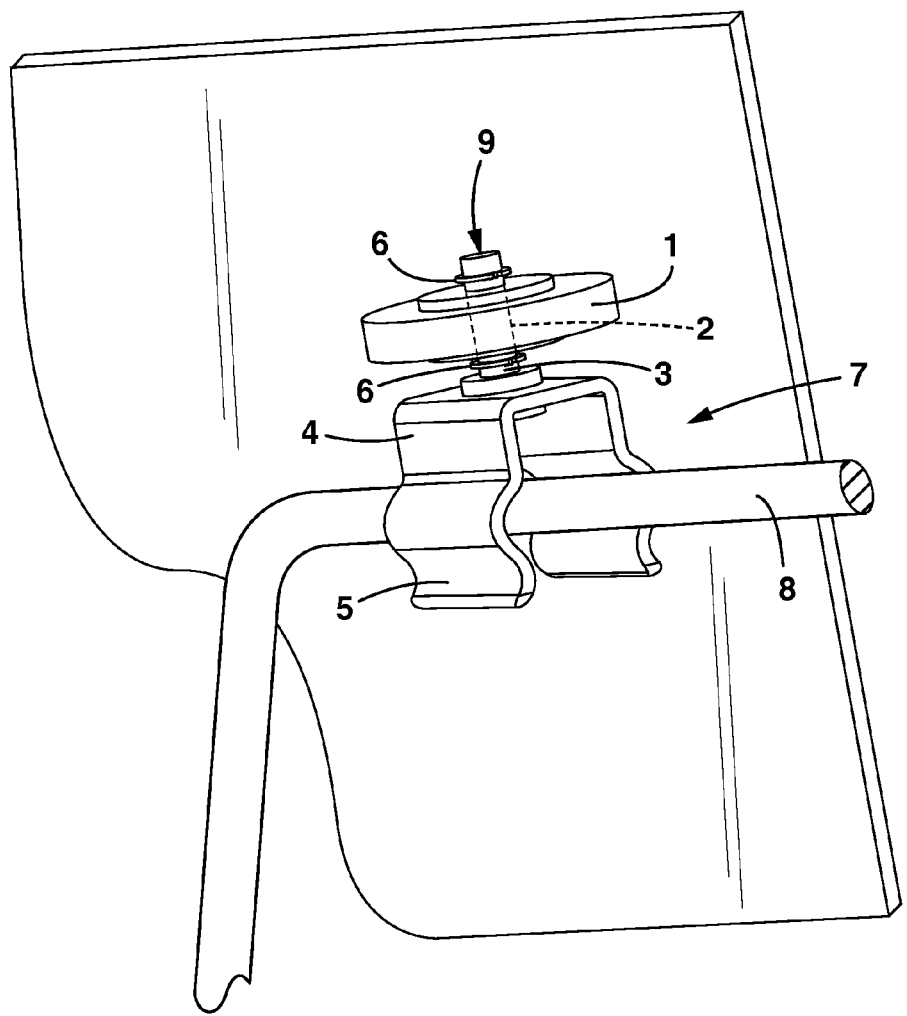
FIG. 2 shows a perspective view of the apparatus in FIG. 1 embodying features of an example of the invention and showing the apparatus being attached to a wicket rod.

As shown in FIG. 2, a perspective view of the apparatus in FIG. 1, embodying features of an example of the invention and showing the apparatus being attached to a wicket rod, comprises a roller 1 having a passage 2 running through its center. Within the passage 2 is located an axle 3 with at least one axle end 9 being prevented from passing through the passage 2 via a retainer clip 6 on either side of the roller 1. The apparatus further includes a clip 7 having a support end 4 and opposing clip ends 5, with the axle 3 being connected to the support end 4 and the clip 7 being attached via its clip ends 5 to a rod of a wicket 8 of a type which is well known in the industry.

Figure 3:
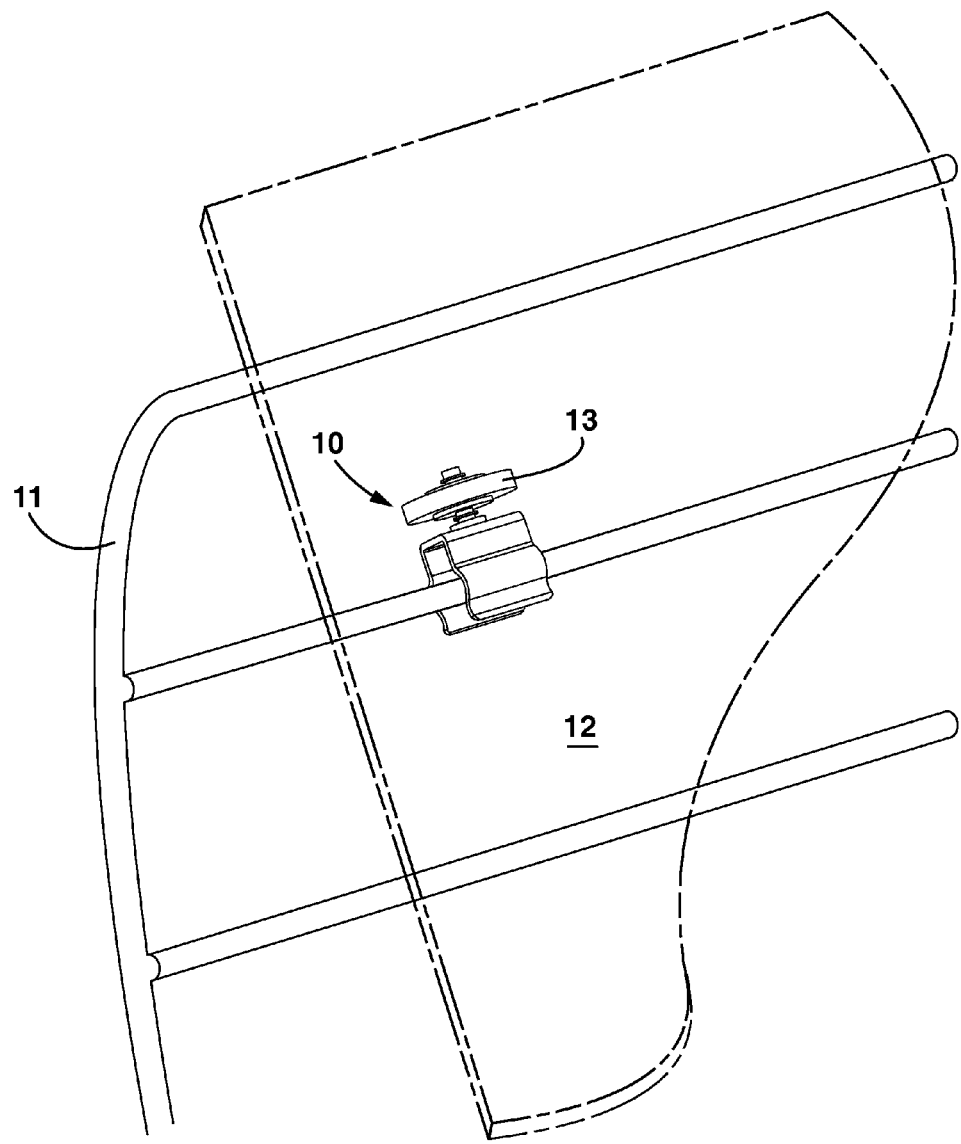
FIG. 3 shows a perspective view of another version of an apparatus embodying features of an example of the invention attached to a wicket assembly and supporting a sheet of tinplate.

As shown in FIG. 3, a perspective view of an apparatus embodying features of another example of the invention attached to a wicket assembly and supporting a sheet of tinplate comprises the apparatus 10 attached to a wicket assembly 11 and supporting a sheet of tinplate 12 which contacts a roller 13.

Figure 4:
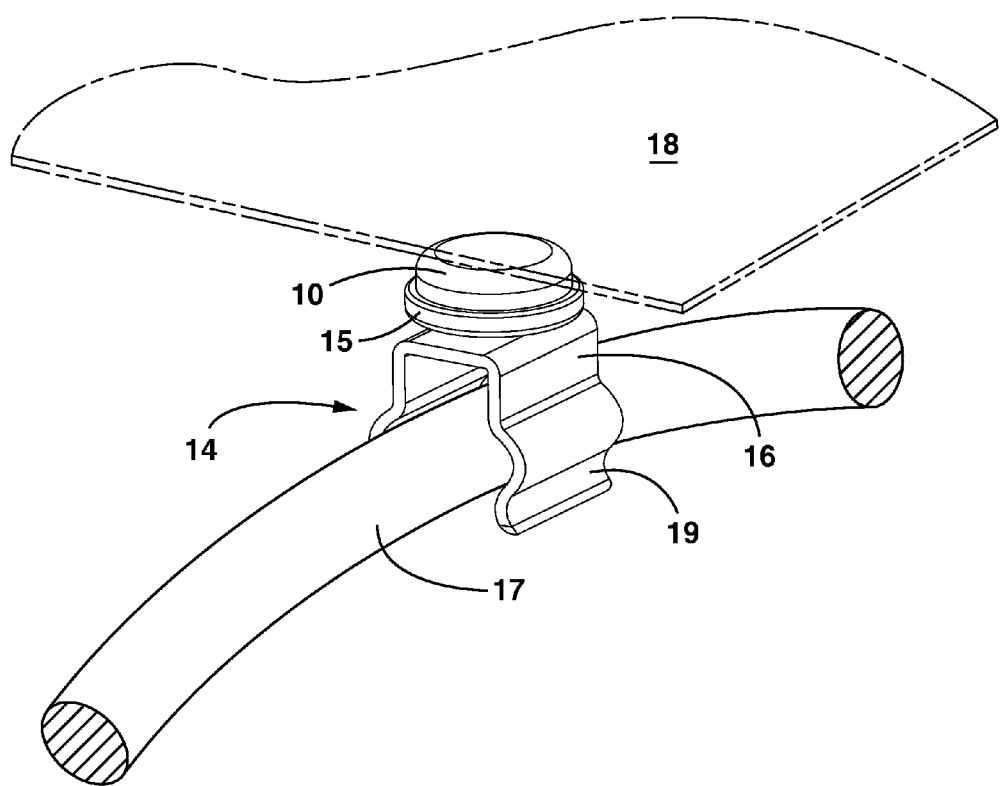
FIG. 4 shows a perspective view of another version of an apparatus embodying features of an example of the invention.

As shown in FIG. 4, a perspective view of another version of an apparatus embodying features of an example of the invention comprises a low friction surface 10 being attached to holder 15 and a clip 14 having a clip end 19 and a support end 16. The apparatus further includes a holder 15 attached to the support end 16. When the clip end 19 is attached to a wicket assembly 17 the low friction surface 10 contacts a sheet of tinplate workpiece 18.

As shown in FIG.5A, a section view taken from FIG. 5 showing an embodiment of the invention acting on a workpiece comprises a sheet of tinplate workpiece 12 in an alternative position having moved off a first at least one roller 13 attached to a first wicket 11. The workpiece having passed through alternative positions 12a and 12b and coming to rest on a second at least one roller 13a attached to a second wicket 11a.

The previously described versions of the present invention have many advantages, including that, by having the sheet in contact with a roller of the apparatus, the sheet is prevented from contacting the wicket assembly and scratching from the wicket assembly is effectively eliminated. Additionally, because the apparatus is small and merely clips onto the wicket assembly, it is inexpensive to manufacture and implement. The particular shapes and configurations of the apparatus as set forth above are preferred because of the above-mentioned advantages, but are not required in all versions of the invention.

Although the present invention has been described in considerable detail with the reference to certain preferred versions thereof, other versions are possible. For example, the roller of the apparatus might be a surface that is low friction by its nature, such as glass, and provide the friction reduction properties of the apparatus without the use of a rotating roller such as the embodiment depicted in FIG. 4. Therefore, the spirit and scope of the appended claims should not be limited to the description of the preferred versions contained herein.

Insofar as the description above and the accompanying drawings disclose any additional subject matter that is not within the scope of the claims below, the inventions are not dedicated to the public and the right to file one or more applications to claim such additional inventions is reserved.

The reader's attention is directed to all papers and documents which are filed concurrently with this specification and which are open to public inspection with this specification. The contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalents or similar features.

What I claim is:

1. An apparatus comprising:
   at least one roller;
   the roller having a passage;
   an axle;
   the axle having at least one axle end;
   the axle being located within the passage;
   the axle being securely retained within the passage so as not to slide through the passage;
   the passage and axle being engaged in such a way as to allow the roller to spin about the axis of the passage;
   a clip;
   the clip having a clip end and a support end;
   the at least one axle end being attached to the support end; and
   the clip end being removably attached to a wicket.

2. The apparatus of claim 1, wherein the at least one axle end is removably attached to the support end.

3. The apparatus of claim 1, wherein the wicket is part of a wicket oven.

4. An apparatus comprising:
   at least one low friction surface;
   at least one holder;
   the at least one low friction surface being engaged with the at least one holder; a clip;

the clip having a clip end and a support end;
the support end being attached to the at least one holder; and
the clip end being removably attached to a wicket.

5. The apparatus of claim 1 wherein the at least one holder is removably attached to the support end.

6. A method of protecting sheet stock from damage during processing, the method comprising:
   (a) connecting one or more low-friction devices to a wicket assembly, each low friction device including:
      at least one roller with a central passage therethrough, an axle extending through the central passage, the axle being retained within the central passage by retainers connected to the axle with the roller captured between the retainers, and
      a clip connected to an axle end;
   (b) attaching the one or more low-friction devices to the wicket assembly with the clips of the one or more low-friction devices clipped to the wicket assembly and the rollers of the one or more low-friction devices extending in the same direction from the wicket assembly; and
   (c) supporting, during processing, a sheet of material via the rollers of the one or more low-friction devices contacting the sheet and spacing apart the sheet and the wicket assembly.

7. A method for handling metal sheets during processing, the method comprising:
   (a) loading a metal sheet onto a first plurality of low-friction devices attached to a horizontal first wicket of a wicket oven, each of the first plurality of low-friction devices including a roller mounted for rotation about a roller axle, the roller extending beyond both sides of the first wicket;
   (b) rotating the first wicket towards a vertical position while moving the first wicket into the wicket oven, the metal sheet rotating with the first wicket to an edgewise position between the first wicket and a vertical second wicket including a second plurality of low-friction devices attached thereto; and
   (c) rotating the second wicket to a horizontal position while moving the second wicket out of the wicket oven, the metal sheet being supported by the second plurality of rollers spaced apart from the second wicket while the second wicket rotates to the horizontal position.

8. The method of claim 7, wherein loading the metal sheet includes rolling the metal sheet from a horizontal conveyor onto the first plurality of low-friction devices.

9. A roller assembly configured for mounting to a wicket of as wicket oven, the roller assembly comprising:
   a roller clip including a first and second clip jaws, the first and second clip jaws extending opposite each other;
   a roller axle connected to the roller clip;
   a roller connected for rotation about the roller axle, the roller having circular perimeter; and
   wherein the first and second clip jaws receive a rod of a wicket and the roller assembly is positioned on the rod with the roller axle being in the plane of the wicket, the circular perimeter extending beyond both sides of the plane.

10. A wicket roller system for handling metal sheets for processing in a wicket oven, the system comprising:
   a first wicket and a second wicket, each of the first and second wickets being connected to a wicket conveyor along a wicket edge;
   a first plurality of low-friction devices attached to the first wicket and a second plurality of low-friction devices attached to the second wicket, each low- low-friction device of the first and second plurality of low-friction devices including a roller mounted for rotation about a roller axle, and each roller axle being in the plane of the respective wicket;
   the first plurality of low-friction devices supporting a metal sheet offset from the first wicket at a wicket oven entrance, the first wicket at the entrance being positioned horizontally;
   the first plurality of low-friction devices supporting the metal sheet offset from the first wicket while the first rotates towards a vertical position within the wicket oven;
   the second plurality of low-friction devices supporting the metal sheet offset from the second wicket while the second wicket rotates towards a horizontal position at a wicket oven exit.

11. The wicket roller system of claim 10, wherein each roller axle of the first and second pluralities of low-friction devices is parallel to the planes defined by the respective first and second wickets.

12. The wicket roller system of claim 10, wherein each low-friction device of first and second pluralities of low-friction devices includes a roller clip, and wherein each low-friction device is attached to the wicket by the roller clip receiving a rod of the respective first and second wickets.

* * * * *